United States Patent

Takeuchi et al.

[11] Patent Number: 4,483,145
[45] Date of Patent: Nov. 20, 1984

[54] MASTER CYLINDER

[75] Inventors: Hiroaki Takeuchi, Aichi; Hiroshi Kawaguchi, Shizuoka; Kiyoshi Nishiwaki, Shizuoka; Fujio Toba, Shizuoka; Yoshihisa Nomura, Aichi, all of Japan

[73] Assignees: Aisin Seiki Kabushiki Kaisha, Kariya; Toyota Jidosha Kogyo Kabushiki Kaisha, Toyota, both of Japan

[21] Appl. No.: 335,248

[22] Filed: Dec. 28, 1981

[30] Foreign Application Priority Data

Dec. 26, 1980 [JP] Japan .............. 55-189217[U]

[51] Int. Cl.³ .............................................. B60T 11/28
[52] U.S. Cl. ....................................... 60/578; 60/562; 60/589
[58] Field of Search ................. 60/562, 589, 578, 592; 137/599.2; 251/359, 339, 228

[56] References Cited

U.S. PATENT DOCUMENTS

| | | | |
|---|---|---|---|
| 3,937,021 | 2/1976 | Sisco et al. | 60/589 |
| 4,156,348 | 5/1979 | Brown | 60/589 |
| 4,338,787 | 7/1982 | Kawaguchi | 60/589 |

Primary Examiner—Abraham Hershkovitz
Assistant Examiner—Scott L. Moritz
Attorney, Agent, or Firm—Oblon, Fisher, Spivak, McClelland & Maier

[57] ABSTRACT

A master cylinder is provided on the cylinder body with a reservoir-receiving mouth formed near the border of the section of of a large diameter and the section of a small diameter of a stepped bore, a through hole being formed between the bottom surface of the reservoir-receiving mouth and the first pressure chamber, a compensation hole being formed between the bottom surface of the reservoir-receiving mouth and the second pressure chamber, a valve seat fitted in and fixed to the reservoir-receiving mouth and having an internal hole formed therein, a check valve provided within the reservoir-receiving mouth between the bottom surface of the reservoir-receiving mouth and the valve seat with the valve element being pressed against a resilient member fixed to the valve seat by means of a spring, a projecting member protruding into the first pressure chamber through the through hole provided for the valve element coaxially with the valve element so that the valve element is titlted to form a passage between the valve element and the resilient member by engagement of the piston section of a small diameter of the stepped piston with the projecting member while the stepped piston is at a return position, and the valve element including a passage formed therein through which the first pressure chamber communicates with the reservoir via the internal hole formed in the valve seat and an relief valve for maintaining the passage closed until the effective pressure within the first pressure chamber reaches a predetermined value.

1 Claim, 2 Drawing Figures

MASTER CYLINDER

BACKGROUND OF THE INVENTION

1. Field of the Invention

This invention relates to a master cylinder applied to the hydraulic brake system of vehicles and, more particularly, to a master cylinder capable of delivering a large quantity of working fluid during the initial stage of the operating stroke thereof, while producing a high pressure in the latter stage of the working stroke thereof.

The master cylinder of such type includes a cylinder having a stepped bore and a stepped piston slidably fitted in the stepped bore of the cylinder jointly forming a first pressure chamber within the section of a large diameter of the bore and a second pressure chamber within the section of a small diameter of the bore. The first pressure chamber communicates with a resevoir through a check valve which allows flow of the working fluid from the reservoir to the first chamber when a negative pressure is effective in the first pressure chamber and through a relief valve which allows flow of the working fluid from the first pressure chamber into the reservoir when the pressure effective within the first chamber exceeds a predetermined pressure. The master cylinder is adapted to allow flow of the working fluid from the first pressure chamber into the second pressure chamber through the periphery of a cup seal attached to the piston section of a small diameter of the stepped piston due to the pressure difference between the pressures of the first and second pressure chamber.

2. Description of the Prior Art

It is well known in the master cylinder art that the pressure chamber needs to communicate with the reservoir to fill the pressure chamber with the fluid contained in the reservoir when the brake system is not actuated. In the case of a conventional master cylinder, the first pressure chamber communicates continuously with the reservoir by means of a second narrow passage separately formed in order to meet such need.

However, such a conventional construction of the master cylinder has the disadvantage in that the quantity of the fluid flowing from the first pressure chamber into the second pressure chamber is affected by the brake pedal operating speed, thus resulting in a variation of the stroke of the brake pedal. For example, when the brake pedal is pushed inwardly very slowly, most of the quantity of the fluid to be delivered from the first pressure chamber into the second pressure chamber flows into the reservoir through the narrow passage formed between the first pressure chamber and the reservoir so that an excessively long stroke of the brake pedal is necessary to raise the pressure in the second pressure chamber.

SUMMARY OF THE INVENTION

The object of the present invention is to overcome the above-noted disadvantage of the prior art. According to the present invention, a master cylinder is provided on the cylinder body with a reservoir-receiving mouth formed near the border of the section of a large diameter and the section of a small diameter of a stepped bore, a through hole is formed between the bottom surface of the reservoir-receiving mouth and the first pressure chamber, a compensation hole is formed between the bottom surface of the reservoir-receiving mouth and the second pressure chamber, a valve seat is fitted in and fixed to the reservoir-receiving mouth and has an internal hole formed therein, a check valve is provided within the reservoir-receiving mouth between the bottom surface of the reservoir-receiving mouth and the valve seat with the valve element pressed against a resilient member fixed to the valve seat by means of a spring, a projecting member protruding into the first pressure chamber through the through hole is provided for the valve element coaxially with the valve element so that the valve element is tilted to form a passage between the valve element and the resilient member by engagement of the piston section of a small diameter of the stepped piston with the projecting member while the stepped piston is at a return position, and the valve element including inside thereof a passage through which the first pressure chamber communicates with the reservoir via the internal hole of the valve seat and a relief valve for maintaining the passage closed until the effective pressure with the first pressure chamber reaches a predetermined value.

BRIEF DESCRIPTION OF THE DRAWINGS

Various objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
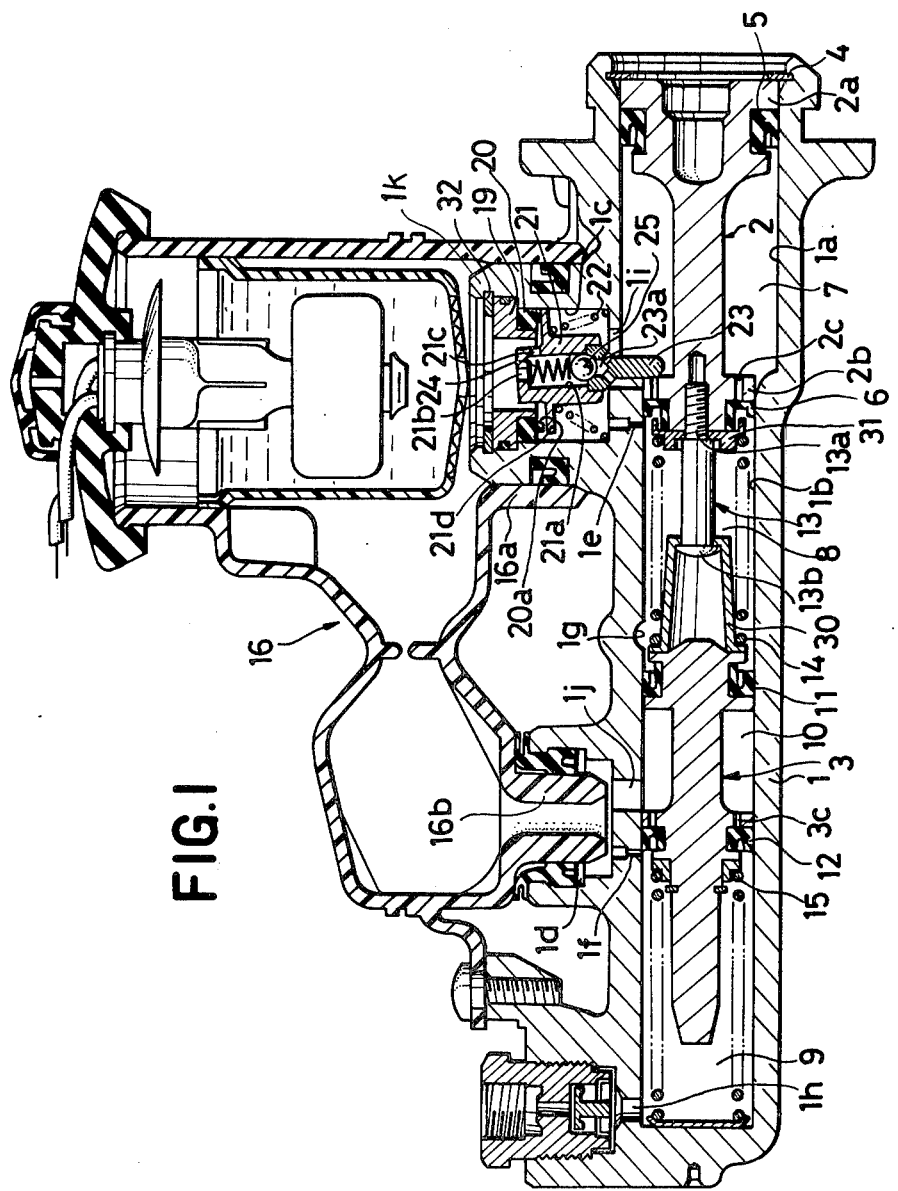
FIG. 1 is a sectional view of a first embodiment according to the present invention.
Figure 2:
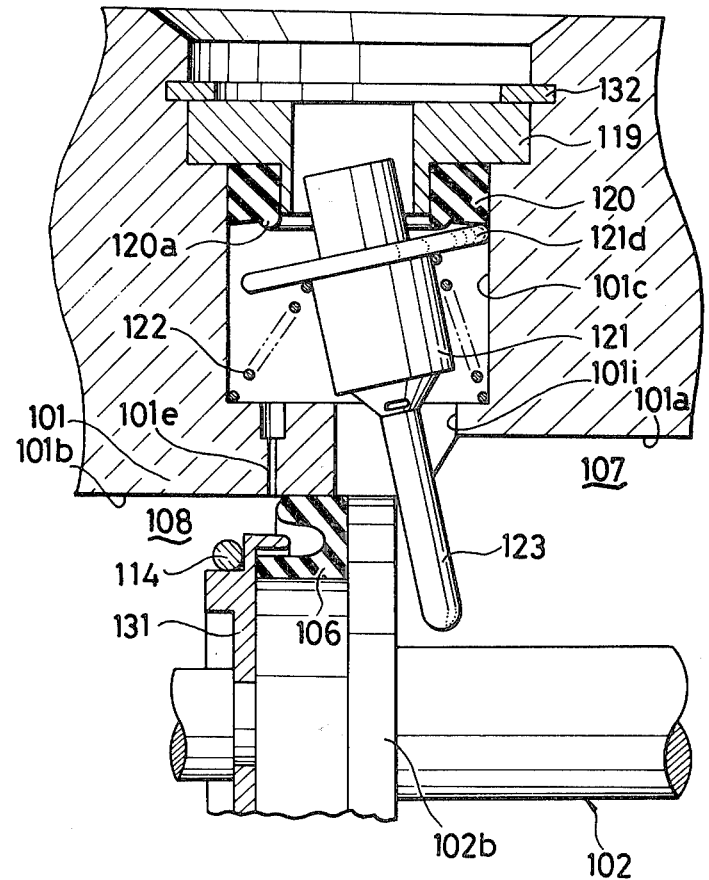
FIG. 2 is a segmentary sectional view of a second embodiment according to the present invention illustrating the principal part thereof.

As shown in FIG. 1 and FIG. 2, a large bore 1a and a small bore 1b are formed within a cylinder body 1 to form a stepped bore. The large piston section 2a of a larger diameter and the small piston section 2b of a smaller diameter of a primary piston 2 are slidably fitted in the large bore 1a and the small bore 1b, respectively. Furthermore, a secondary piston 3 is slidably fitted in the small bore 1b. A retainer 4 provided within the bore and the opening end of the cylinder body determines the return position of the primary piston 2. Cup seals 5 and 6 are attached to the large piston section 2a and the small piston section 2b, respectively, of the primary piston 2. Thus a first pressure chamber 7 is formed within the larger bore 1a of the stepped bore.

A second pressure chamber 8 is formed between the small piston section 2b of the primary piston 2 and the secondary piston 3, while a third pressure chamber 9 is formed between the secondary piston 3 and the end wall of the small bore 1b of the stepped bore. A fluid chamber 10 is formed around the secondary piston 3 and a hole 2c is formed on the small piston section 2b for allowing the fluid to flow from the first pressure chamber 7 into the second pressure chamber 8. Cup 6 is adapted to allow the fluid to flow from the first pressure chamber 7 into the second pressure chamber 8, such flow being caused by a small pressure difference between the pressure effective within the first pressure chamber 7 and the pressure effective within the second pressure chamber 8.

A cup seal 11 is attached to the secondary piston 3 at one end thereof near the primary piston for preventing fluid flow from the the second pressure chamber 8 into the fluid chamber 10, whereas a cup seal 12 is engageable with a hole 3c for allowing the fluid to flow from the fluid chamber 10 into the third pressure chamber 9 that is formed at the other end of the secondary piston 3. Cup seal 12 is adapted to allow the fluid to flow from the fluid chamber 10 into the third pressure chamber 9, such flow being caused by a small pressure difference between the pressure effective within the fluid chamber 10 and the third pressure chamber 9.

A pin 13 disposed within the second pressure chamber 8 is fixed to the primary piston 2 by screwing a threaded part 13a thereof formed at the right-hand end of the pin 13 into the primary piston 2. A first return spring 14 is retained between a retainer 30, and a retainer 31, with retainer 30 being slidably fitted to the pin 13 and capable of sliding to the left relative to the pin 13 until it is stopped by a head 13b of the pin 13 formed at the left end thereof and the retainer 31 is fixed to the primary piston 2 with the pin 13. A second return spring 15 for urging the secondary piston 3 to the right as seen in the drawing is provided in the third pressure chamber 9. The spring force of the second return spring 15 is weaker than that of the first return spring 14, however, such force is strong enough to make the pistons 2 and 3 slide within the bore. Accordingly, when the brake system is in an idle state and the primary piston 2 is not being pushed to the left, the primary piston 2 is retained at the return position as shown in the drawing with the right end thereof in contact with the retainer 4, while the secondary piston 3 is also retained at the return position where the secondary piston 3 is positioned farthest relative to the pin 13 with the right end thereof in contact with the retainer 30 as shown in FIG. 1.

A cylindrical part 1k having a reservoir-receiving mouth 1c formed inside thereof and being formed so as to be fitted into a cylindrical part 16a of a reservoir 16 and a cylindrical part 1d for receiving a cylindrical part 16b of the reservoir 16 are provided in the cylinder body 1. The reservoir-receiving mouth 1c is formed near the border of the large bore 1a and the small bore 1b of the stepped bore. A through hole 1i extending from the bottom surface of the reservoir-receiving mouth 1c to the first pressure chamber 7 and a compensation hole 1e extending from the bottom surface of the reservoir-receiving mouth 1c to the second pressure chamber 8 are formed in the cylinder body 1. Also, a through hole 1j extending from the bottom surface of the reservoir-receiving mouth 1d to the fluid chamber 10, a compensation hole 1f extending from the bottom surface of the reservoir-receiving mouth 1d to the third pressure chamber 9, an outlet port 1g for connecting the second pressure chamber 8 to the wheel brake cylinder and an outlet port 1h for connecting the third pressure chamber 9 to the wheel brake cylinders are also formed in the cylinder body 1.

The opening end of the reservoir-receiving mouth 1c is slightly enlarged in diameter. An annular valve seat 19 is fitted in the opening end of the reservoir-receiving mouth 1c and fixed by means of a stop ring 32. An annular resilient member 20 made of a resilient material, such as rubber, is fixed to the bottom surface of the valve seat 19. A check valve element 21 having a disc-shaped flange 21d around its periphery is interposed between the valve seat 19 and the bottom surface of the reservoir-receiving mouth 1c and the flange 21d is pushed against an annular protrusion 20a of the resilient member 20 by the force of a volute spring 22 applied to the disc-shaped flange 21d, thus forming a check valve. A hole 21a is formed in the central part of the check valve element 21 and is opened at one end thereof at the bottom of the check valve elements 21. The end portion of a projecting member 23 is fitted in the hole 21a. Projecting member 23 is fixed to the check valve element 21 by permanently deforming the edge of the opening end of the hole 21a. The projecting member 23 extends into the first pressure chamber 7 through the through hole 1i and is adapted to be pushed by the small piston section 2b of the primary piston 2 when the primary piston 2 is positioned at the return position so that the check valve element 21 is tilted as shown in FIG. 1 to form a gap between the flange 21d of the check valve element 21 and the resilient member 20.

Hole 21a of the check valve element 21 communicates with the inner hole of the valve seat 19 by means of holes 21b and 21c. A passage 23a for delivering the fluid from the first pressure chamber 7 into the hole 21a of the check valve element 21 is formed in the projecting member 23. A relief valve 25 for keeping the passage 23a closed by the force of a spring 24 until the pressure in the first pressure chamber 7 reaches a predetermined value is contained in the hole 21a of the check valve element 21.

The manner of operation of the master cylinder of the present invention will be described hereinafter. In braking a vehicle, force applied to the brake pedal is transmitted to the primary piston 2 so that the primary piston 2 is actuated to move to the left, as seen in FIG. 1. Consequently, the primary piston 2 and the secondary piston 3 operate as a unit so that communication between the compensation hole 1e and the second pressure chamber 8 as well as communication between the compensation hole 1f and the third pressure chamber 9 are interrupted by the cup seal 6 and the cup seal 12, respectively. At the same time, the flange 21d of the check valve element 21 is seated on the annular protrusion 20a of the resilient member 20 by the force of the volute spring 22 so that communication between the first pressure chamber 7 and the reservoir 16 is interrupted. With the successive operation of the primary piston 2, the pressure effective within the first pressure chamber 7 and the second pressure chamber 8 increase and the pressure in the third pressure chamber 9 increases with the increase in the pressure effective within the second pressure chamber 8. The pressure within the first pressure chamber 7 becomes higher than that within the second pressure chamber 8 so that the fluid flows from the first pressure chamber 7 into the second pressure chamber 8 through the hole 2c and the annular gap between the periphery of the cup seal 6 and the inner wall of the bore of the cylinder body, and is then delivered from the second pressure chamber 8 to the wheel brake cylinders through the outlet port 1g. The quantity of the fluid flowing from the first pressure chamber 7 into the second pressure chamber 8 is not subject to the effect of the operating speed of the primary piston since the first pressure chamber 7 is perfectly isolated from the reservoir 16.

When the pressure within the first pressure chamber 7 exceeds a predetermined valve as a result of a progressive increase in the pressure effective in the first pressure chamber 7 with the increase in the pressure in the second pressure in the second pressure chamber 8, the relief valve 25 opens the passage 23a to discharge the pressurized fluid from the first pressure chamber 7 into the reservoir 16 so that the increase in pressure in the first pressure chamber 7 is checked. Accordingly, the incremental force applied to the brake pedal and transmitted to the primary piston 2 contributes to raising the pressure in the second pressure chamber 8 so that the pressures in the second pressure chamber 8 and the third pressure chamber 9 are raised to a higher level.

When the brake pedal is released, the pistons 2 and 3 are forced to return to the respective return positions by the first return spring 14 and the second return spring 15. When the pressure in the first pressure chamber 7 is reduced to a negative pressure during the return travel of the pistons 2 and 3, the pressure difference between the first pressure chamber 7 and the reservoir 16 causes the check valve element 21 to separate from the resilient member 20 against the force of the spring 22 to allow fluid to flow from the reservoir 16 into the first pressure chamber 7. When the pressure in the second pressure chamber 8 is reduced to a negative pressure, fluid flows from the first pressure chamber 7 into the second pressure chamber 8 through the hole 2c and the periphery of the cup seal 6, while fluid flows from the fluid chamber 10 into the third pressure chamber 9 through the hole 3c and the periphery of the cup seal 13 when the pressure in the third pressure chamber 9 is reduced to a negative pressure.

When the primary piston 2 and the secondary piston 3 are returned to their respective return positions, the primary piston 2 forces the check valve element 21 to tilt so that a gap is formed between the resilient member 20 and the check valve element 21 to allow the first pressure chamber 7 to communicate with the reservoir 16 by means of the gap. At the same time, the second pressure chamber 8 and the third pressure chamber 9 also are allowed to communicate with the reservoir 16 by means of the compensation holes 1e and 1f, respectively.

In the second embodiment according to the present invention as shown in FIG. 2, a check valve element 121 is adapted to be separated entirely from the annular protrusion 120a of a resilient member 120 while the master cylinder is in an idle state. In FIG. 2, the bottom surface, which carries the annular protrusion 120a, of the resilient member 120 fixed to the valve seat 119 is tapered so as to position the outside circumference thereof below the inside circumference thereof. Thus, in tilting the check valve element 121 by the return motion of a primary piston 102, the check valve element 121 pivots on a contact point between the check valve element 121 and the annular protrusion 120a of the resilient member 120 in the initial stage and in the latter stage of the tilting after the outside edge of the flange 121d comes in contact with the bottom surface of the resilient member 120, the check valve element 121 pivoting on the contact point between the outside edge of the flange 121d and the bottom surface of the resilient member 120 until finally the check valve element 121 separates entirely from the annular protrusion 120a of the resilient member 120. Thus, according to this second embodiment, the local and prolonged application of the force of a spring 122 to the annular protrusion 120a is avoided. Accordingly, there is no possibility of local wearing of the annular protrusion 120a and, hence, no possibility of faulty contact between the flange 121d of the check valve element 121 and the annular protrusion 120a during operation of the master cylinder. In FIG. 2, elements corresponding to those of FIG. 1 are designated by reference numerals in 100 series corresponding to the respective reference numerals of FIG. 1.

The present invention has been described with reference to the embodiments assuming the use of a tandem master cylinder, however, the present invention is applicable also to single master cylinder having no secondary piston 3.

It is obvious from what has been described hereinbefore that, according to the present invention, the quantity of the fluid that flows from the first pressure chamber 7 into the second pressure chamber 8 is not affected by the travelling speed of the primary piston 2, therefore, the stroke of the brake pedal is stabilized and an excessive stroke of the brake pedal is not necessary if the brake pedal is pushed slowly. Furthermore, since the check valve element 21 is forced to be seated on the resilient member 20 by means of a spring 22, the check valve element 21 is firmly seated on the resilient member 20 and is capable of smooth movement. Still further, since the resilient member 20 is fixed to the valve seat 19, the force of the spring 22 may be of a reduced magnitude and, hence the negative pressure generated in the first pressure chamber 7 during the return travel of the pistons 2 and 3 can be reduced to a lower level. In addition, since the projecting member 23 of the check valve element 21 is fixed to the check valve element 21 coaxially with the check valve element 21, the check valve can be assembled without regard to the orientation of the check valve element 21, thus facilitating assembly.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A master cylinder comprising:
   a cylinder body having a stepped bore;
   a stepped piston slidably fitted in said stepped bore so as to form within said stepped bore a first pressure chamber in a section of a first diameter thereof and a second pressure chamber in a section of a second diameter less than said first diameter thereof;
   a reservoir-receiving mouth formed on said cylinder body near the border of said second of said first diameter and said section of said second diameter wherein a through hole opening being formed on the bottom surface of said reservoir-receiving mouth and in said first pressure chamber, a compensation hole opening being formed on the bottom surface of said reservoir-receiving mouth and in said second pressure chamber and an exit opening in said second pressure chamber is formed on said cylinder body;
   a cup seal for interrupting communication of said second pressure chamber with said compensation hole when said stepped piston is actuated starting from a return position thereof and which is attached to the piston section of said second diameter of said stepped piston so as to allow fluid to flow from the first pressure chamber into the second pressure chamber through the periphery of said cup seal when the pressure in said first pressure chamber is higher than the pressure in said second pressure chamber;
   check valve means including a valve seat having an internal hole formed therein, a resilient member fixed to the valve seat, a valve element having an internal passage therein for exhausting the fluid from said first pressure chamber to said reservoir through said internal passage, relief valve means arranged in said internal passage and normally closing said internal passage and a first spring disposed between said valve element and said bottom surface of said reservoir-receiving mouth so as to seat said valve element on said resilient member;

said relief valve means having a second spring and a ball arranged within said internal passage of said valve element so as to close said internal passage until the pressure within said first pressure chamber reaches a predetermined value; and a projecting member protruding into said first pressure chamber through said through opening on the bottom surface of the reservoir-receiving mouth and into the first pressure chamber provided for said check valve means coaxially with said valve element thereof so as to form a passage between said valve element and said resilient member by tilting said valve element upon engagement of said projecting member with said piston section of said second diameter of said stepped piston when said stepped piston is at rest at a return position thereof wherein said resilient member further comprises a tapered surface portion engageable with said valve element and a protrusion extending from an inner circumference portion above said tapered surface such that upon return motion of said piston, said valve element pivots about a point of contact with said tapered surface.

* * * * *